3,749,798
1-CHLORO - 1 - HYDROPERFLUOROBUTYL DI-
FLUOROMETHYL ETHER AS AN INHALATION
ANESTHETIC
Ross C. Terrell, Plainfield, N.J., assignor to Airco, Inc.
No Drawing. Filed Oct. 7, 1971, Ser. No. 187,572
Int. Cl. H61k 27/00
U.S. Cl. 424—342                  2 Claims

ABSTRACT OF THE DISCLOSURE 1-chloro-1-hydroperfluorobutyl difluoromethyl ether of the formula

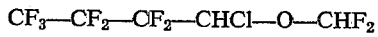

is useful as an inhalation anesthetic.

This invention relates to 1-chloro-1-hydroperfluorobutyl difluoromethyl ether and its use in producing anesthesia in anesthetic-susceptible mammals. The chemical formula for this ether is

The compound of the present invention lends itself to effective use as an inhalant anesthetic in respirable mixtures containing life-supporting concentrations of oxygen, with or without other inhalation anesthetics, such as nitrous oxide. Administration of the compound may be by any of the well known techniques for administering general inhalation anesthetics, for example, by using the open drop or semi-closed systems.

The effective amount of the compound of this invention to be employed depends on the level of anesthesia to which the mammal is to be brought, the rate at which anesthesia is to be induced, and the length of time over which anesthesia is to be maintained. Minor volume percentages of the compound in oxygen, e.g. at least about 1.5%, and preferably up to about 4.0%, can be employed. The amount of anesthetic to be used can be regulated, starting with a small amount of the ether and gradually increasing the amount until the desired plane of anesthesia is reached. By then monitoring the physical reactions of the mammal, as is the usual procedure, the duration and plane of anesthesia can be readily controlled.

The ether compound of this invention is also easily miscible with other organic liquids, including fats and oils, and has useful solvent properties, for example, as a solvent for fluorinated olefins and other fluorinated materials, such as fluoro waxes. The compound of this invention may be used to prepare pastes and dispersions of such materials useful for coatings and the like, and may be used as a degreasing agent.

Preparation of 1-chloro-1-hydroperfluorobutyl difluoromethyl ether can be by reacting equimolar amounts of chlorine and 1,1 - dihydroperfluorobutyl difluoromethyl ether.

The following examples will serve further to illustrate the present invention:

EXAMPLE I

Preparation of the intermediate $CF_3CF_2CF_2CH_2OCHF_2$

Commercially obtained 2,2,3,3,4,4,4-heptafluoro butanol (200 g.) was introduced into a one liter autoclave. The sealed autoclave was stirred while commercially obtained liquid chlorodifluoromethane (75 ml.) was added through a pressure burette. A 50% solution of NaOH (243 g.) was added to the autoclave at such a rate as to maintain the reaction temperature at 25–40° C. with outside cooling. The reaction proceeded smoothly with a slight exotherm and was maintained at about 30° C. for one hour with stirring. The autoclave was then opened and the contents distilled to obtain 197 g. of crude ether. The crude ether was washed with aqueous NaOH and then redistilled to obtain 111 g. of a fraction of 98.4% pure $CF_3CF_2CF_2CH_2OCHF_2$, B.P. 69–69.5° C. at 760 mm.

EXAMPLE II

Preparation of $CF_3CF_2CF_2CHClOCHF_2$ $CF_3CF_2CF_2CH_2OCHF_2$ (89.3 g.) was reacted with chlorine gas at a temperature of 35–50° C. in a glass apparatus in the presence of incandescent light. The reaction was continued until one mole of HCl was observed to have been produced. The crude liquid product was purified by fractional distillation and preparative gas chromatography.

Calculated for $C_5H_2ClF_9O$ (percent): C, 21.1; F, 60.1. Found (percent): C, 21.4; F, 60.0.

This normally liquid compound has a boiling point of 84° C., a specific gravity of 1.62, a vapor pressure at 25° C. of 84 mm. Hg, and an ethereal odor. It is nonflammable.

In order to determine the potency of the ether of the present invention as an inhalation anesthetic in combination with oxygen, tests were carried out on mice. The compound tested was at least 99.5% pure as determined by vapor phase chromatography. In the tests, the ether compound is administered to test mice by a standard procedure in which a measured quantity of the agnt is placed in a laboratory jar and allowed to completely vaporize so as to give a calculated vapor concentration. The test mice are then quickly placed in the jar and observed. Anesthesia is determined by observing the righting reflex of the mice. Recovery time is measured beginning when the mice are transferred from the test jar to room air and ending when the mice are observed to be able to walk.

In such tests the 1-chloro-1-hydroperfluorobutyl difluoromethyl ether induced a very light anesthesia in one minute 50 seconds when employed at a vapor concentration of 1.5%; recovery required 1 minute 14 seconds. Using a vapor concentration of 2.5% the induction time was reduced to one minute and the recovery lengthened to 3 minutes; again the anesthesia was very light. In both the 1.5% and 2.5% tests there was much hyperextension of the neck, which did not, however, have the appearance of classical opisthotonus.

At a vapor concentration of 4% the compound of this invention induced a deeper anesthesia in 40 seconds; recovery required 4 minutes. The induction at this vapor concentration was accompanied by some excitement, and the same neck extension was observed at the beginning of maintenance, i.e. right after induction. The mice then quieted, with some respiratory depression. In both the 2.5% and 4% tests the mice were sluggish after recovery.

While there has been described what are at present considered to be preferred embodiments of the invention, it will be understood that various modifications may be made therein which are within the true spirit and scope of the invention.

I claim:
1. An inhalant anesthetic composition comprising an anesthetically effective amount of 1-chloro-1-hydroperfluorobutyl difluoromethyl ether and oxygen.

2. A method of anesthetizing an anesthetic-susceptible mammal which comprises administering by inhalation to the mammal an anesthetically effective amount of 1-chloro-1-hydroperfluorobutyl difluoromethyl ether as an inhalation anesthetic while administering life-supporting amounts of oxygen.

References Cited

Chemical Abstracts 68: 12475a (1968).

JEROME D. GOLDBERG, Primary Examiner

U.S. Cl. X.R.

260—614 F